J. A. KELLER.
VEHICLE TIRE.
APPLICATION FILED OCT. 27, 1908.
967,643.
Patented Aug. 16, 1910.
2 SHEETS—SHEET 1.
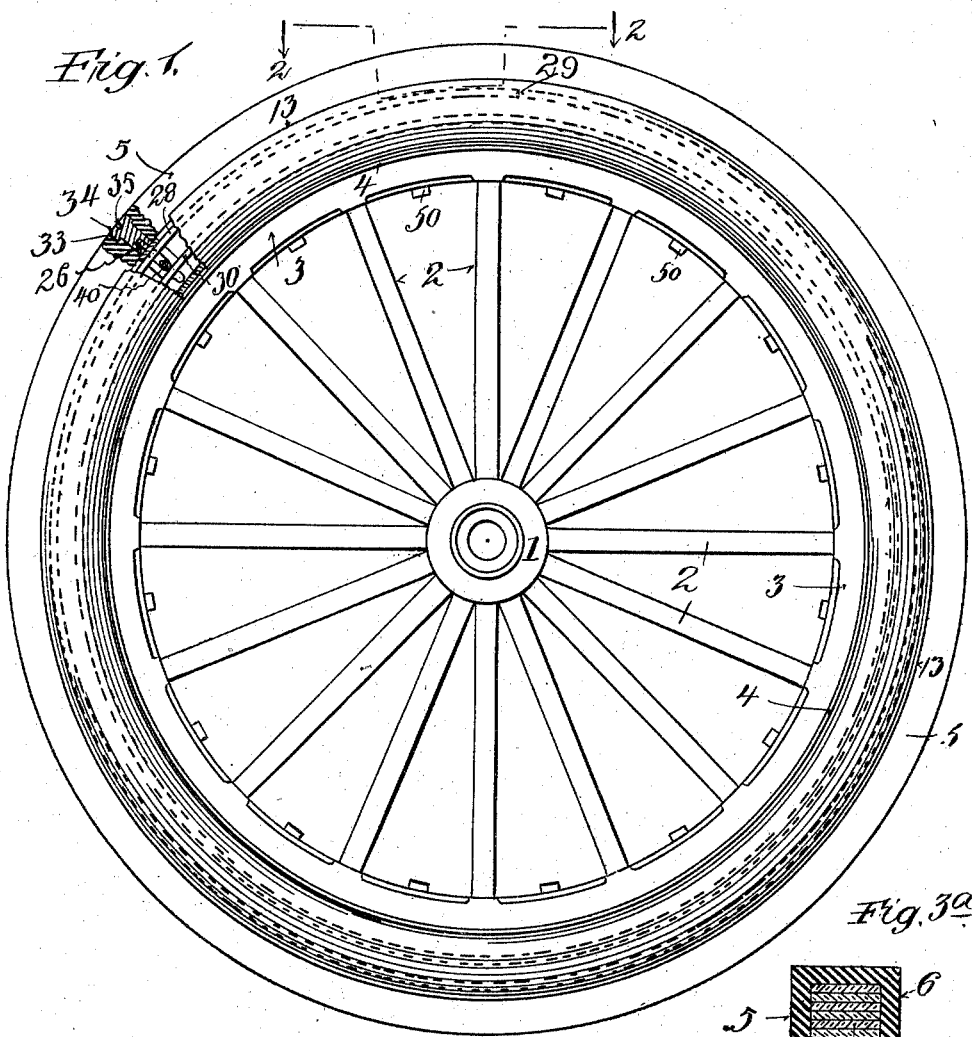
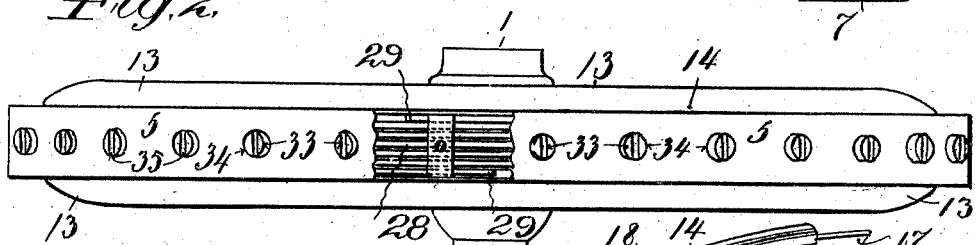
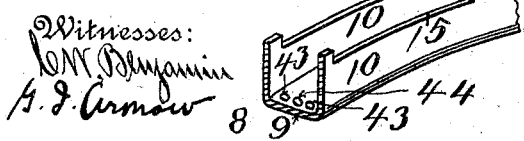
Inventor
John A. Keller.
By his Attorney

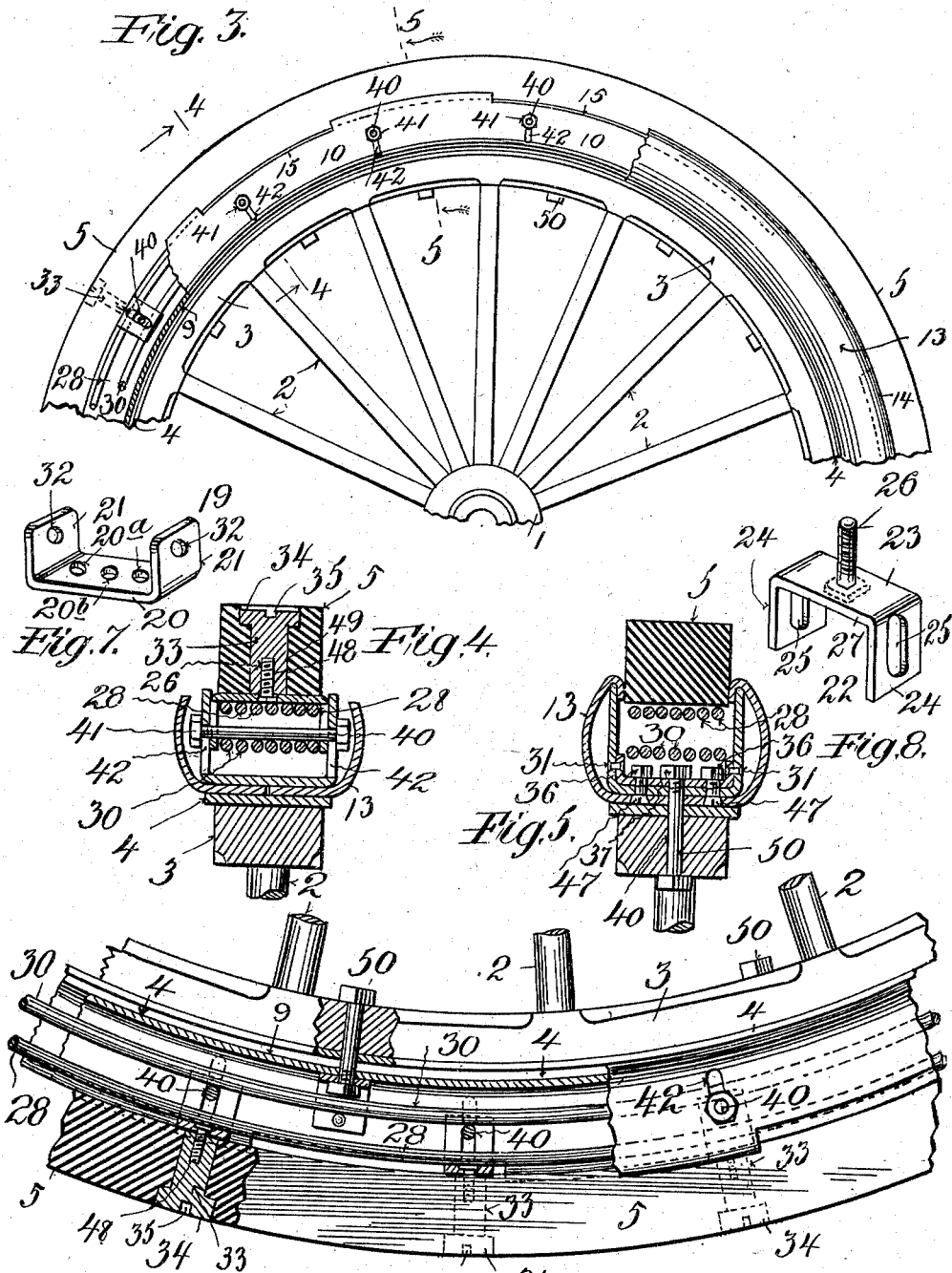

UNITED STATES PATENT OFFICE.

JOHN A. KELLER, OF NEW YORK, N. Y., ASSIGNOR TO LEE SHUBERT, OF NEW YORK, N. Y.

VEHICLE-TIRE.

967,643.  Specification of Letters Patent.  Patented Aug. 16, 1910.

Application filed October 27, 1908. Serial No. 459,696.

*To all whom it may concern:*

Be it known that I, JOHN A. KELLER, a citizen of the United States, and a resident of the city, county, and State of New York, have invented certain new and useful Improvements in Vehicle-Tires, of which the following is a specification.

My invention has for its object to aid in the construction of a vehicle wheel in which a solid as distinguished from a pneumatic tire or tread is employed, the tread being spring or resiliently supported and connected to the body of the wheel.

The object of my invention is to cheapen the cost of construction of vehicle tires, wherein resilient elements are employed; to avoid the discomfort of puncturable treads; to increase the life and endurance of the tire; to render a tire of this character more readily repairable; to increase the service efficiency of a tire of this character; to increase the facility of assemblage; and to generally simplify the construction.

I accomplish the above objects by the construction herein shown and described and finally pointed out in the claims.

In the drawings forming part of this specification, Figure 1 is a side elevation of a wheel embodying my invention, the parts being broken away to disclose the interior construction. Fig. 2 is a plan view of the same, a part being likewise broken away. Fig. 3 is a side elevation of a portion of the wheel, parts of the tire being broken away to disclose the interior construction thereof. Fig. 4 is a sectional elevation taken substantially on the line 4—4 of Fig. 3, looking in the direction of the arrows with the cheek plates added. Fig. 5 is a like view taken substantially on the line 5—5 of Fig. 3, looking in the direction of the arrows. Fig. 6 is an enlarged side elevation of a portion of the wheel, partly in section, and partly broken away to disclose the interior construction. Fig. 7 is a perspective view of one of the rim-channel saddles. Fig. 8 is a like view of one of the tread-yokes. Fig. 1ª is a perspective view of a portion of the rim-channel. Fig. 2ª is a like view of one of the cheek-pieces. Fig. 3ª is a sectional view of a modified form of tread.

Similar numerals of reference indicate corresponding parts throughout the several views.

The embodiment of my invention herein shown and described may be applied to any desired wheel construction, the one herein illustrated comprising a hub 1, spokes 2, felly 3, and stay-band 4.

About the stay-band 4 my improved tire is constructed. It consists essentially of three parts, an exterior circular tread, a rim, and a continuously-coiled and spirally-disposed spring with its coils interposed between the tread and the rim. These springs may be single or duplicate, as shown. The embodiment of my invention includes a sectional rim, although the essential features of my invention may be used in any other approved form of rim.

At 5 is the elastic tread, preferably of rubber of the character usually employed in vehicle tires, and which is continuously circular in its configuration. This tread may be solid, or may be composite, as in Fig. 3ª, in which it is formed in the shape of a channel 6 with interposed laminæ 7 of fabric, the laminæ being secured together and vulcanized to the rubber.

The seat for the tread (which seat forms part of the rim) and the spring or springs consist of a rim-channel 8 comprising a horizontal web 9, and two vertical side-webs 10. This rim limits the movement of the tread-supporting springs, guides the tread in its in-and-out movement under the stress of the springs, and restrains the tread against lateral movement or displacement.

In the specific embodiment herein shown, a portion of the rim comprises two cheek-pieces 11, both being similarly constructed, so that when united as hereinafter described, they form a continuously annular receptacle for the rim-channel. The cheek-pieces each comprises an inwardly extending flange 12, an upwardly extending portion 13 curved outwardly to give finish to the rim, and an inwardly and downwardly extending flange 14. The upper edge of the side walls of the rim-channel are provided with a series of depressions 15 forming a series of elevations 16; and the flange 14 of the cheek-pieces is cut away to form a depression 17 leaving an extension or pocket 18 between each pair of the cut-away portions. By means of this construction the cheek-pieces can be readily and detachably secured to the channel-rim.

At 19 is the rim-channel saddle, which comprises a horizontal web 20, and two upright side webs 21.

At 22 is a tread-yoke comprising a horizontal web 23, and two pendent side-pieces 24 provided with slots 25, the horizontal web being perforated to receive a bolt 26 with a squared head 27 set into the web (as shown in Fig. 4) to prevent the bolt from turning.

At 28 is one of the tire-springs, which consists of a continuous rod of spring wire or any other desired material of resilient nature, disposed in coils, the coils being disposed, as, shown, transversely of the wheel, the ends of the springs being free as indicated at 29, in Fig. 2. I prefer to employ two sets of these coils, the second set 30, similarly constructed, being located nearer the felly of the wheel than the first mentioned set and acting subsequent to the first.

The elements of the tire above described may be assembled as follows: After the rim-channel 8 is suitably conformed, the rim-channel saddles 19 are riveted thereto as shown in Fig. 5 by rivets 31 passed through holes 32 in the side-webs 21 and in the side-pieces of the rim-channel. The rim-channel saddles are located at suitable intervals around the inner periphery of the rim-channel, and the cross-piece is further provided with holes $20^a$, $20^b$, nuts 36, 37 being secured to the saddle over these holes by brazing or otherwise.

The parts of the tire may be assembled as follows: The spring 30 may be coiled or formed within the rim-channel, or otherwise, its internal diameter being suitably determined. Then bolts 40 having each a head, and a nut 41 are passed through slots 42 formed in the channel side-pieces 10 at suitable intervals, as shown in Fig. 3. Just enough of these bolts are used at this time to secure the spring in place. The coils of the spring then lie transversely of the wheel. Then the outer spring 28 is placed within the rim-channel and over the spring 28, in the same way. The tread yokes 22 are then used to hold the spring in position. To do this the balance of the bolts 40 are passed through the slots 42 in the rim-channel side-pieces 10, after all of the tread saddles, except those that are to be used with the bolts previously inserted, have been placed in the rim-channel with their side-pieces 24 inward and the bolts 26 extending outwardly, and the bolts 40 passed through their slots 25, the nut which may be at either end of the bolt being turned up so that both nut 41 and the head of the bolt will be bearing on the sides of the rim-channel, as shown in Fig. 3. Then the bolts 40 which were previously inserted may be withdrawn, the balance of the tread-yokes inserted, and the bolts replaced through both rim-channel and yokes and secured in position as before described. The cheek-pieces are then secured in position as follows: Their flanges 12, each in their turn are laid under and against the web 9 of the rim-channel, the pocketed projections 18 being alined with the depressions 15 in the sides of the rim-channel. By turning the cheek-pieces the projections 16 will be passed into pocketed projections 18, and rim-channel and cheek-pieces detachably locked together as shown in Figs. 4 and 5. When so locked holes 43, 44 formed in the cross-web 9 of the rim-channel and holes 45 formed in the flange 12 of the cheek-pieces will be respectively alined with holes $20^a$, $20^b$ formed in the cross-piece 20 of the saddles 19. At desired intervals apertures are formed in the opposing edges of the flanges 12 of the cheek-pieces, and holes formed in the felly 3. Screw bolts 47 are passed through the holes 45 in the cheek-pieces, 43 in the rim-channel, and $20^a$ in the saddle 19. They are then screwed into the nuts 36 (which have been secured against turning), which secures the cheek-pieces solidly to the rim-channel. The tread 5 in which holes 49 have previously been formed is sprung over the rim, so that it is seated between the flanges 14 of the cheek-pieces and on the cross-pieces 23 of the tread-yokes, with the threaded bolts 26 extending outward into the holes 49. Then shanks 33 of studs having enlarged heads 34 and grooves 35 therein are forced into the holes 49, internally threaded holes 48 in the shanks being alined with the bolts 26. By turning the studs (the bolts 26 being prevented from turning by the squared head 27) the tread 5 and the tread-yokes will be securely fastened together. These studs preferably lie slightly below the outer surface of the tread as shown in Fig. 4, and act as preventatives against "skidding".

After the tire is completed as above described, it may be fastened to the wheel felly by the bolts 50 which are passed through the holes 46 in the felly 3, the holes 44 in the rim-channel, $20^b$ in the rim-channel saddles, and suitable apertures formed in the stay-band 4, and screwed into the nut 37, which is fast to the cross-piece 20 of the saddle 19. This firmly secures the rim and wheel together, and provides means for quickly releasing the tire from the wheel.

In operation the tread will be flattened at the point of contact, co-extensively flattening the outer spring 28, and should the stresses or strains be more than ordinarily severe the outer spring will ride up against the bolts 40 guided by the slotted tread-yokes, and will compress or distend, as the case may be, the inner spring 30, the slots in the tread-yokes guiding the bolts 40. The bolts 40 prevent the tread from creeping on the rim, at the same time limiting the in-and-out movement of the tread.

The tire may be readily taken apart for the purpose of repairing by first removing the bolts 50 that pass through the felly of the wheel, when the entire rim can be taken off. Then by unlocking the cheek-pieces from the rim-channel side-pieces after removing the bolts 47, they can be removed and the nuts on the cross-bolts 40 got at for the purpose of disconnecting the tread, its saddles, and the contained springs.

It will be apparent from the foregoing that my invention can be embodied in varying forms of construction without departing from the spirit thereof.

Having described my invention, I claim:

1. A vehicle tire comprising an annular channel having radial slots in its sides, tread yokes having slotted side pieces, cheek pieces detachably secured to the sides of the channel, a circular tread, a spiral spring having coils disposed circumferentially parallel with the tread and movably confined in contact with the latter, and means for guiding and restraining said tread and spring within said channel and holding the tread against creeping on the rim.

2. A vehicle tire comprising an annular channel, cheek pieces detachably secured to the sides of the channel, a circular tread, a spiral spring having coils disposed circumferentially parallel with the tread and movably confined in contact with the latter, and means for guiding and restraining said tread and spring within said channel and holding the tread against creeping on the rim, said channel having radial slots in its sides, and yokes to which the tread is secured, bolts extending through said slots and through slots in the yokes, said yokes having coils of the spring lying within and bearing thereagainst.

3. In a vehicle tire, the combination with the elastic tread, a rim, a spiral spring having coils circumferentially disposed and movably confined within said rim parallel with the inner wall thereof, saddles embracing said spring, studs extending from said tread and means for securing the saddles and studs together.

4. In a tire the combination of a rim-channel having radial slots formed in its sides, bolts extending through said slots, tread-yokes having slotted side-pieces through which said bolts extend, a tread secured to said yokes, and spirally disposed springs, the coils of one of which lie within and bear against said yokes, the coils of the other of which bear against said bolts.

JOHN A. KELLER.

Witnesses:
O. E. EDWARDS, Jr.,
GUSTAVE I. ARONOW.